United States Patent
Ding et al.

(10) Patent No.: US 10,866,645 B2
(45) Date of Patent: Dec. 15, 2020

(54) HAPTIC FEEDBACK METHOD, SYSTEM, AND CONTROL DEVICE FOR TOUCH DISPLAY SCREEN OF VEHICLE

(71) Applicant: AAC Technologies Pte. Ltd., Singapore (SG)

(72) Inventors: Xiang Ding, Shenzhen (CN); Yulei Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/536,305

(22) Filed: Aug. 8, 2019

(65) Prior Publication Data

US 2020/0050278 A1  Feb. 13, 2020

(30) Foreign Application Priority Data

Aug. 13, 2018 (CN) .......................... 2018 1 0917295

(51) Int. Cl.
*G06F 3/01* (2006.01)
*B60K 37/06* (2006.01)
*B60Q 9/00* (2006.01)
*G06F 3/041* (2006.01)

(52) U.S. Cl.
CPC .............. *G06F 3/016* (2013.01); *B60K 37/06* (2013.01); *B60Q 9/00* (2013.01); *G06F 3/041* (2013.01); *B60K 2370/1438* (2019.05); *B60K 2370/158* (2019.05)

(58) Field of Classification Search
CPC ........ G06F 3/016; G06F 3/017; G06F 3/0488; G06F 3/041
See application file for complete search history.

(56) References Cited

U.S. PATENT DOCUMENTS

| 2015/0185885 A1* | 7/2015 | Lacroix | G06F 3/04886 345/173 |
| 2016/0342215 A1* | 11/2016 | Endo | G06F 3/044 |
| 2019/0276051 A1* | 9/2019 | Marti | G06F 3/016 |

* cited by examiner

*Primary Examiner* — Dennis P Joseph
(74) *Attorney, Agent, or Firm* — W&G Law Group LLP

(57) ABSTRACT

A haptic feedback method for a touch display screen of a vehicle is disclosed. The method includes: acquiring a touch operation of a user from the touch display screen of the vehicle; determining a type of the acquired touch operation, and retrieving a pre-stored feedback signal corresponding to the type of the touch operation, wherein different types of the touch operations correspond to different feedback signals; and transmitting the corresponding feedback signal to an actuator, and driving the actuator to vibrate by using the feedback signal for providing haptic feedback. A haptic feedback system and a haptic feedback control device are also provided.

15 Claims, 4 Drawing Sheets

HAPTIC FEEDBACK METHOD, SYSTEM, AND CONTROL DEVICE FOR TOUCH DISPLAY SCREEN OF VEHICLE

TECHNICAL FIELD

Embodiments of the present disclosure relate to the field of automotive technologies, and in particular, to a haptic feedback method, a haptic feedback system, and a haptic feedback control device for a touch display screen of a vehicle.

BACKGROUND

With the improvement of living standards of people, vehicles play an increasingly important role in daily lives of people. More and more people choose to drive vehicles as a means of transportation in long-distance travel, family travel and daily commuting. However, with the increasing number of people driving vehicles, driving safety of vehicles has gained more and more attention.

However, the inventors of the present disclosure have found that, in existing driving devices such as cars, human generally need to interact with electronic devices. For example, during driving, it is often necessary to control volume or air conditioner, switch songs, or the like. Thus, drivers are often required to use their eyes to check whether an operation is correct. In this way, more sight and attentions are distracted from driving, which may cause potential safety hazards during driving.

BRIEF DESCRIPTION OF THE DRAWINGS

One or more embodiments are described illustratively with reference to the corresponding figures in the accompanying drawings. The illustrative description is not intended to limit the embodiments. Elements in the figures that have same reference numerals refer to similar elements. The scales of the elements are not limited to the scales shown in the figures, unless otherwise stated.

DETAILED DESCRIPTION

Figure 1:
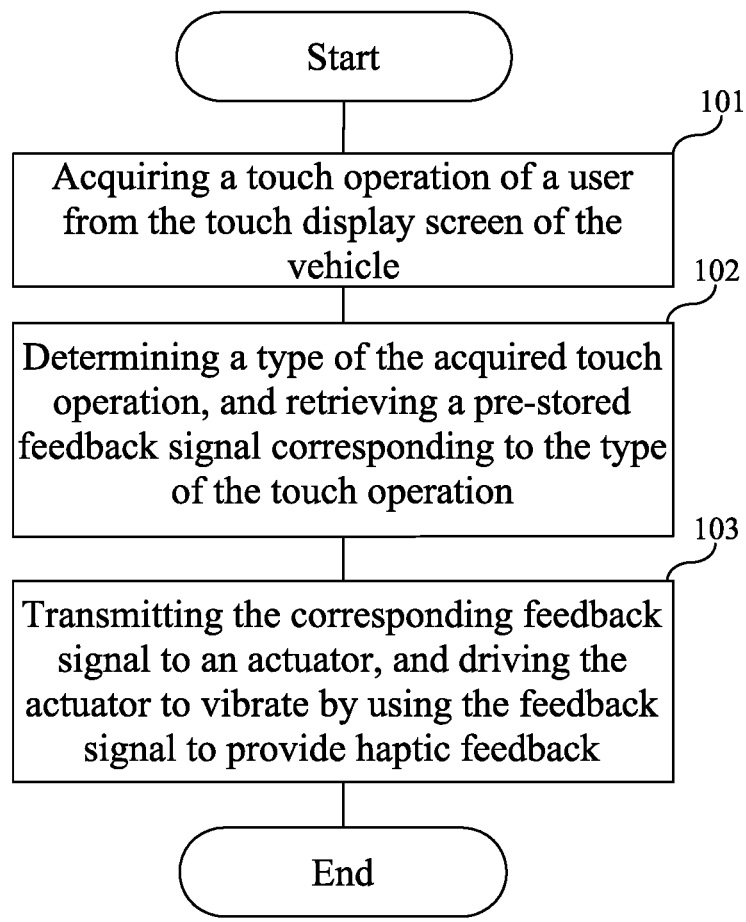
FIG. 1 is a flow chart of a haptic feedback method for a touch display screen of a vehicle according to a first embodiment of the present disclosure.

In order to make the objective, the technical solutions and the technical effects of the present disclosure more clearly, the embodiments of the present disclosure will be further described in detail below with reference to the accompanying drawings. It should be understood by those skilled in the art that, a plurality of technical details are provided in order to provide the readers with a better understanding of the present disclosure in various embodiments of the present disclosure. However, the technical solutions claimed in the present disclosure can be implemented by various changes and modifications based on the following embodiments without these technical details.

In addition, terms such as "first", "second", "third", and the like are used herein for purposes of description, and are not intended to indicate or imply relative importance or significance or to imply the number of indicated technical features. Thus, the feature defined with "first", "second", "third", and the like may include one or more of such a feature. In the description of the present disclosure, "a plurality of" means two or more, unless specified otherwise. Moreover, the terms "comprise", "include" or any other variations thereof are meant to cover non-exclusive including, so that the process, method, article or device comprising a series of elements do not only include those elements, but also include other elements that are not explicitly listed or also include the inherent elements of the process, method, article or device. In the case that there are no more restrictions, an element qualified by the statement "comprises a . . ." does not exclude the presence of additional identical elements in the process, method, article or device that includes the said element.

In a first embodiment of the present disclosure, a haptic feedback method for a touch display screen of a vehicle may be provided. The method may include: acquiring a touch operation of a user from the touch display screen of the vehicle; determining a type of the acquired touch operation, and retrieving a pre-stored feedback signal corresponding to the type of the touch operation, wherein different types of the touch operations correspond to different feedback signals; transmitting the corresponding feedback signal to an actuator, and driving the actuator to vibrate by using the feedback signal to provide haptic feedback. In some embodiments, different haptic feedbacks may be provided based on different types of touch operations of the user driving the vehicle, and the user may acquire an operation instruction identified by the vehicle via different haptic feedbacks, and determine whether the operation instruction identified by the vehicle conforms to an operation intention of the user, thereby confirming whether the previous touch operation is correct. In this way, the whole process may be achieved by the tactile sense of the user without diverting the sight lines of the user, thereby reducing the distraction of the sight lines and attentions of the user during driving, and in turns reducing the potential safety hazard during driving. Some implementation details of the haptic feedback method for the touch display screen of the vehicle of the present embodiment may be specifically described below. The following content are only the implementation details provided for the convenience of understanding, and are not necessary for implementing the present solution.

The haptic feedback method for the touch display screen of the vehicle in this embodiment may be shown in FIG. 1. The method may include actions/operations executed by the following blocks.

At block 101, a touch operation of a user may be acquired from the touch display screen of the vehicle.

More specifically, the vehicle may be provided with the touch display screen. The display screen may display a plurality of function keys that need to be interacted with the user. The function keys may include for example: a switch key of an air conditioner, a temperature adjustment key of the air conditioner, a switch key of a music player, a volume adjustment key, a control switch key of a window, a control switch key of a door, a control switch key of a rear view mirror, or the like. Since different function keys have different characteristics, different function keys may be implemented in different forms on the display screen. The function keys may be implemented in the form of buttons, sliders, or the like. For example, the switch key may only have the functions of turning on and off, and thus the switch key may be often implemented in form of a button. However, the adjustment key may often have a gradual process, and thus the adjustment key may be often implemented in form of a slider. Of course, the foregoing is only an example, and the implementation forms of the specific function keys can be set by the users themselves, and may not be limited to the embodiment described herein. The user may touch the function key on the touch display screen of the vehicle to select a certain function, and a processing device for haptic feedback may acquire the touch operation of the user.

At block 102, a type of the acquired touch operation may be determined, and a pre-stored feedback signal corresponding to the type of the touch operation may be retrieved.

More specifically, the touch operation may be pre-stored in a processor of the vehicle control system, and the type of the touch operation of the user may be determined. The types of the touch operations described herein may be the types of those touch operations trigged by different function keys of the vehicle. The function key selected by the user may be distinguished by the type of the touch operation. A mapping relationship between different types of the touch operations and the feedback signals may be pre-stored in the processor, and different types of touch operations may correspond to different feedback signals. In some embodiments, the feedback signals may be waveform signals. By changing parameters of the waveform signals, such as amplitudes, frequencies, duration time, or the like, different feedback signals may generate different waveform signals. For example, the feedback signal corresponding to the switch key of the air conditioner may be a waveform signal having a high frequency and a short duration time. The feedback signal corresponding to the volume adjustment key of the music player may be a waveform signal having a low frequency and a long duration time. The waveform signal having a low frequency and a long duration time may be further divided into a waveform signal corresponding to an increase of the volume and a waveform signal corresponding to a decrease of the volume. When the volume is increased, the amplitude of the waveform signal is gradually increased; when the volume is decreased, the amplitude of the waveform signal is gradually decreased. The forgoing is illustrative description. The corresponding feedback signals described above are only for the user to easily distinguish different types of touch operations from each other. For example, the switch key of the air conditioner and the switch key of the music player may be distinguished from each other by the frequencies of the feedback waveform. The mapping relationship between the types of the touch operations and the feedback signals may be set by the user. Thus, the present embodiment is merely illustrative and does not provide a limitation to the present disclosure.

At block 103, the corresponding feedback signal may be transmitted to an actuator, and the actuator may be driven to vibrate by using the feedback signal to provide haptic feedback.

Moore specifically, by determining the type of the touch operation of the user, it is possible to distinguish which function key is selected by the user, and in turn retrieve the feedback signal (that is, the waveform signal) corresponding to the type of the touch operation. The processor of the vehicle control system may transmit the retrieved feedback signal to the actuator of the vehicle. The actuator may be driven to vibrate by using the feedback signal (that is, the waveform signal), in order to provide the haptic feedback. For example, when the type of the touch operation of the user is the type of the touch operation trigged by the switch key of the air conditioner, the actuator may provide haptic feedback to the user via a vibration having a high frequency and a short duration time. When the type of the touch operation of the user is the type of the touch operation trigged by increasing the volume of the volume adjustment key, the actuator may provide haptic feedback to the user via a vibration having a low frequency, a long duration time, and an ever-increasing amplitude. Since different types of touch operations correspond to different feedback signals, the user may distinguish different operation types from each other based on different haptic feedbacks provided by the actuator. In this way, it is possible to acquire the operation instruction identified by the vehicle and determine whether an operation instruction identified by the vehicle conforms to an operation intention of the user, thereby confirming whether the previous touch operation is correct. In this way, the whole process may be achieved by the user's touch to determine whether the touch operation is correct without diverting the sight lines of the user, thereby reducing the distraction of the sight lines and attentions of the user during driving. In this way, it is possible to reduce the potential safety hazards during driving, and greatly improve the safety of driving vehicle.

In some embodiments, the actuator may include an actuator connected to the touch display screen of the vehicle, an actuator connected to a vehicle seat, an actuator connected to a steering wheel, or the like. The actuator may be implemented as a linear actuator, a ceramic actuator, or the like.

In addition, the feedback signal corresponding to the type of the touch operation of the user may be transmitted to the actuator connected to the touch display screen of the vehicle. By transmitting the feedback signal to the actuator connected to the touch display screen of the vehicle, it is possible to ensure that the user may perceive the haptic feedback given by the actuator in time.

Further, it should be noted that the feedback signal corresponding to the type of the touch operation of the user may also be transmitted to the actuator connected to the vehicle seat or the actuator connected to the steering wheel, such that the user may determine whether the type of the touch operation is correct based on the haptic feedback on the back or the hand. Of course, the user may also perceive the vibration of the actuator from other parts of the body, and determine whether the type of the previous touch operation is correct based on the form of the vibration.

In some embodiments, the corresponding feedback signal may also be simultaneously transmitted to a plurality of actuators of the vehicle. The feedback signal may be simultaneously transmitted to two or more actuators of the vehicle. For example, the feedback signal may be simultaneously transmitted to the first actuator connected to the touch display screen of the vehicle, a second actuator connected to the vehicle seat, and a third actuator connected to the steering wheel. In this way, the user may simultaneously perceive from various parts of the body whether the type of touch operation is correct, which may in turn ensure that the user may perceive the haptic feedback given by the actuator in time.

In the present embodiment, the haptic feedback method for the touch display screen of the vehicle may include: acquiring the touch operation of the user from the touch display screen of the vehicle; determining the type of the acquired touch operation, and retrieving the pre-stored feedback signal corresponding to the type of the touch operation, wherein different types of the touch operations correspond to different feedback signals; transmitting the corresponding feedback signal to the actuator, and driving the actuator to vibrate by using the feedback signal to provide haptic feedback. In some embodiments, different haptic feedbacks may be provided based on different types of touch operations of the user driving the vehicle, and the user may acquire an operation instruction identified by the vehicle via different haptic feedbacks, and determine whether the operation instruction identified by the vehicle conforms to an operation intention of the user, thereby confirming whether the previous touch operation is correct. In this way, the whole process may be achieved by the tactile sense of the user without diverting the sight lines, thereby reducing the distraction of the sight lines and attentions of the user during driving, and in turns reducing the potential safety hazards during driving.

In a second embodiment of the present disclosure, a haptic feedback method for a touch display screen of a vehicle may also be provided. More specifically, since the haptic sensitivity of the user may be affected to various degrees by the vehicle in various driving conditions, in this embodiment, the feedback signal may be adjusted based on driving condition data. In this way, it is possible to avoid the situation that the user can not perceive the vibration feedback under a special driving condition, and further reduce the potential safety hazards during driving.

Figure 2:
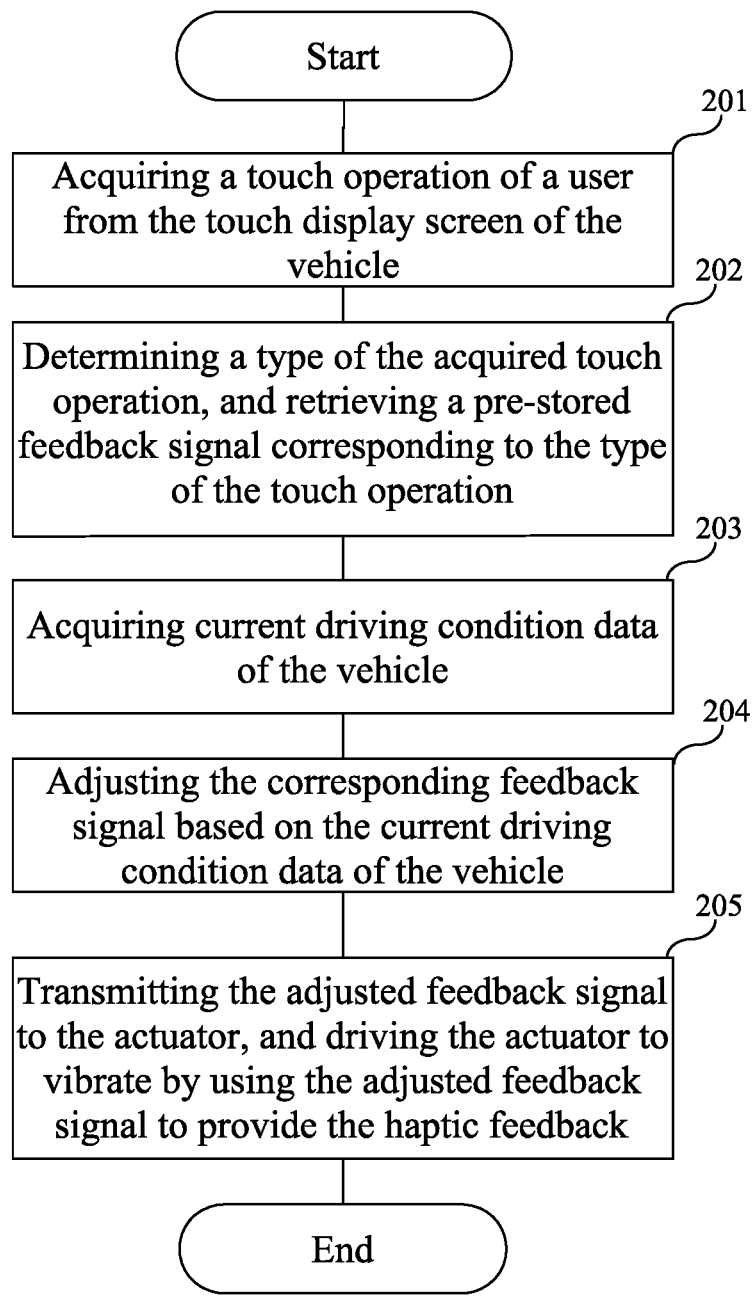
FIG. 2 is a flow chart of a haptic feedback method for a touch display screen of a vehicle according to a second embodiment of the present disclosure.

The haptic feedback method for the touch display screen of the vehicle in this embodiment may be shown in FIG. 2. The method may include actions/operations executed by the following blocks.

At block 201, a touch operation of a user may be acquired from the touch display screen of the vehicle.

At block 202, a type of the acquired touch operation may be determined, and a pre-stored feedback signal corresponding to the type of the touch operation may be retrieved.

The blocks 201 and 202 may be substantially the same as the blocks 101 and 102 in the first embodiment, and may not be described in details herein any more.

At block 203, current driving condition data of the vehicle may be acquired.

More specifically, before transmitting the corresponding feedback signal to the actuator, the current driving condition data of the vehicle may be acquired. Herein, the current driving condition data of the vehicle may be the condition data that affect the user's perception of the haptic feedback or attract the user's attention. For example, the current driving condition data of the vehicle may include at least one of the following: the data indicating a degree of bumping of the vehicle, and the data indicating a volume condition of the player in the vehicle. Since the bumping of the vehicle and the working of the player will cause the vehicle to vibrate to different degrees, at least one of the data indicating the degree of bumping of the vehicle and the data indicating the volume condition of the player may be used as a reference basis for the feedback signal. In this way, it is possible to reduce the influence to the haptic sensitivity of the user and caused by the vibration of the vehicle, and the potential safety hazards may be further reduced during driving. The degree of bumping of the vehicle may directly affect the sensitivity of the user's perception of the haptic feedback of the actuator, while the volume condition of the player in the vehicle may attract a large portion of the user's attention. In this case, when the vibration of the actuator is weak, the user may probably fail to notice the vibration of the actuator. In the present embodiment, the data indicating the degree of the bumping of the vehicle is taken as an example of the current driving condition data of the vehicle for description. However, those skilled in the art may understand that, the current driving condition data of the vehicle is not limited to the example described in the present embodiment. Any condition data that may influence the user's perception of haptic feedback or to attract the user's attention shall be covered within the protection scope of the present embodiment.

At block 204, the corresponding feedback signal may be adjusted based on the current driving condition data of the vehicle.

At block 205, the adjusted feedback signal may be transmitted to an actuator, and the actuator may be driven to vibrate by using the adjusted feedback signal, in order to provide haptic feedback.

With respect to the above blocks 204 and 205, more specifically, taking the data indicating the degree of the bumping of the vehicle as the current driving condition data of the vehicle as an example, if the data indicating the degree of the bumping of the vehicle indicates that the vehicle is in a bumpy state, the feedback signal corresponding to the type of the touch operation of the user may be adjusted, such that the feedback signal provided by the vibration of the actuator driven by the adjusted feedback signal may better match with the current driving situation of the vehicle, and it is possible to further reduce the potential safety hazards during driving.

For example, when the vehicle is in the bumpy state, the feedback signal may be adjusted to increase a strength of the feedback signal. That is, the strength of the feedback signal may be increased by increasing any one of the amplitude of the waveform of the feedback signal, the frequency of the waveform of the feedback signal, the duration time of the waveform of the feedback signal, or a combination thereof. In this way, the vibration of the actuator may be enhanced, such that the haptic feedback provided by the actuator may be stronger. Thus, the user may easily perceive the haptic feedback provided by the actuator even through the vehicle is driving on the bumpy road, and the haptic feedback provided by the actuator may be better match with the current bumpy driving situation. When the vehicle is driving on a gentle road, that is to say, the vehicle is in a gentle state, the feedback signal may be adjusted to decrease the strength of the feedback signal. That is, the strength of the feedback signal may be decreased by decreasing any one of the amplitude of the waveform of the feedback signal, the frequency of the waveform of the feedback signal, the duration time of the waveform of the feedback signal, or a combination thereof. In this way, the vibration of the actuator may be reduced, such that the haptic feedback provided by the actuator may be gentle. Thus, the haptic feedback provided by the actuator may be better match with the current gentle driving situation.

It should be noted that, the above methods for adjusting the feedback signal are merely illustrative, and are not intended to limit the present disclosure. Those skilled in the art can understand that any adjusting method that makes the haptic feedback provided by the actuator which is driven by the adjusted feedback signal better match with the current driving situation shall be covered within the protection scope of the present embodiment.

In some embodiment of the present disclosure, before transmitting the corresponding feedback signal to the actuator, the method may further include actions/operations executed by the following blocks: acquiring the current driving condition data of the vehicle; and adjusting the corresponding feedback signal based on the current driving condition data of the vehicle. Transmitting the corresponding feedback signal to the actuator may include: transmitting the adjusted feedback signal to the actuator, and driving the actuator to vibrate by using the adjusted feedback signal, in order to provide the haptic feedback. Since the haptic sensitivity of the user may be affected to various degrees by the vehicle in various driving conditions, in the blocks of this embodiment, the feedback signal may be adjusted based on the driving condition data. In this way, it is possible to avoid the situation that the user cannot perceive the vibration feedback under the special driving condition, and further reduce the potential safety hazards during driving.

The actions or operations of the above various methods are divided in some embodiments for clarity. However, the actions or operations described above may also be combined into one action or operation, or some actions or operations may also be split into multiple actions or operations. All these shall be covered within the protection scope of the present disclosure, as long as they include the same logical relationship. The technical solution adding insignificant modifications or introducing insignificant designs to an algorithm or process, without changing the core design of the algorithms and processes, shall be covered within the protection scope of the present disclosure.

Figure 3:
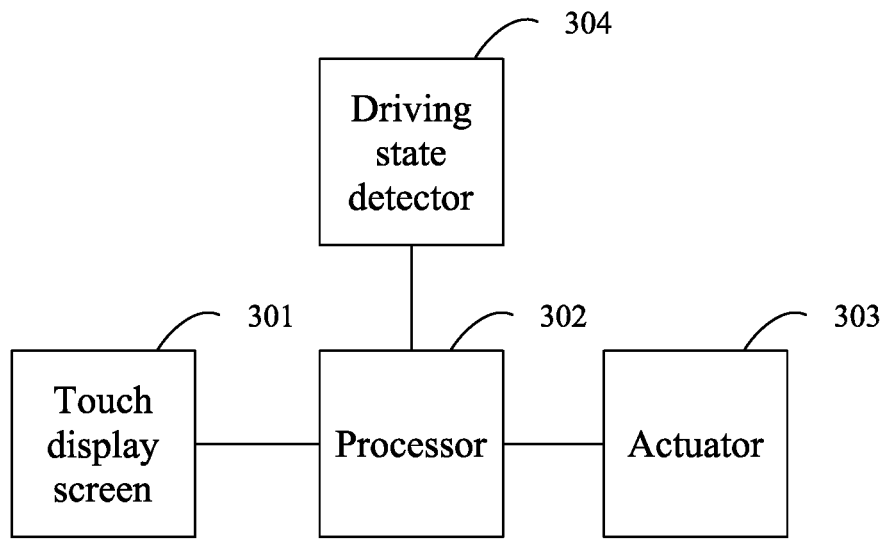
FIG. 3 is a schematic block diagram of a haptic feedback system according to a third embodiment of the present disclosure.

In a third embodiment of the present disclosure, a haptic feedback system may be provided. A block diagram showing the structure of the haptic feedback system may be shown in FIG. 3. The haptic feedback system may include a touch display screen 301 of a vehicle, a processor 302, and an actuator 303. The processor 302 may be communicating with the touch display screen 301 and the actuator 303.

The touch display screen 301 may be configured for receiving a touch operation of the user. The processor 302 may be configured for acquiring the touch operation of the user from the touch display screen 301, determining a type of the acquired touch operation, and retrieving a pre-stored feedback signal corresponding to the type of the touch operation. In this case, different types of the touch operations correspond to different feedback signals. The processor 302 may be further configured for transmitting the corresponding feedback signal to the actuator 303. The actuator 303 may be configured for executing the feedback signal to provide haptic feedback. The actuator 303 of the vehicle may provide different feedbacks based on different types of the touch operations of the user driving the vehicle, such that the user may determine whether the type of the touch operation is correct based on the different haptic feedbacks given by the actuator 303, thereby reducing the distraction of the sight lines and attentions of the user during driving, and in turn reducing the potential safety hazards during driving.

In some embodiments, the haptic feedback system may further include a driving state detector 304, and the driving state detector 304 may be communicated with the processor 302. The driving state detector 304 may be configured for acquiring current driving condition data of the vehicle before transmitting the corresponding feedback signal to the actuator 303, and further transmit the current driving condition data of the vehicle to the processor 302. The processor 302 may be further configured for adjusting the corresponding feedback signal based on the current driving condition data of the vehicle, and transmitting the adjusted feedback signal to the actuator 303. The actuator 303 may be configured for executing the adjusted feedback signal to provide haptic feedback. In some embodiments of the present disclosure, since the feedback signal transmitted to the actuator 303 is adjusted based on the current driving condition data of the vehicle, the haptic feedback provided by the actuator 303 may better match with the current driving condition of the vehicle, and thus it is possible to further reduce the safety hazards during driving.

The processor 302 may be further configured for transmitting the feedback signal to the actuator 303 connected to the touch display screen 301. By transmitting the feedback signal to the actuator 303 connected to the touch display screen 301, it is possible to ensure that the user may perceive the haptic feedback given by the actuator 303 in time.

In addition, it should be noted that the feedback signal corresponding to the type of the touch operation of the user may also be transmitted to the actuator 303 connected to the vehicle seat or the actuator 303 connected to the steering wheel, such that the user may determine whether the type of the touch operation is correct based on the haptic feedback on the back or the hand. In this way, the user may perceive whether the type of touch operation is correct from other parts of the body.

In some embodiments, the processor 302 may also simultaneously transmit the corresponding feedback signal to a plurality of actuators 303 of the vehicle. The feedback signal may be simultaneously transmitted to two or more actuators of the vehicle. For example, the feedback signal may be simultaneously transmitted to the actuator connected to the touch display screen of the vehicle, the actuator connected to the vehicle seat, and the actuator connected to the steering wheel. In this way, the user may simultaneously perceive from various parts of the body whether the type of touch operation is correct, which may in turn ensure that the user may perceive the haptic feedback given by the actuator in time. In some embodiments, the actuator 303 may be a linear actuator or a ceramic actuator.

It should be noted that, the present embodiment relates to a system corresponding to the methods described in above embodiments, and details of the methods described in above embodiments may be applied to the present embodiment, and the content recited in the present embodiment may also be applicable to the methods described in above embodiments.

In the present embodiment, a haptic feedback system is provided. The haptic feedback system includes: a touch display screen of a vehicle, a processor, and an actuator. The processor may be communicating with the touch display screen and the actuator. The touch display screen may be configured for receiving the touch operation of the user. The processor may be configured for acquiring the touch operation of the user, determining the type of the acquired touch operation, and retrieving the pre-stored feedback signal corresponding to the type of the touch operation. In this case, different types of the touch operations correspond to different feedback signals. The processor may be further configured for transmitting the corresponding feedback signal to the actuator. The actuator may be configured for executing the feedback signal to provide haptic feedback. The actuator of the vehicle may provide different feedbacks based on different types of the touch operations of the user driving the vehicle, such that the user may determine whether the type of the touch operation is correct based on the different haptic feedbacks given by the actuator, thereby reducing the distraction of the sight lines and attentions of the user during driving, and in turn reducing the potential safety hazards during driving. Besides, the feedback signal transmitted to the actuator is adjusted based on the current driving condition data of the vehicle, such that the haptic feedback provided by the actuator may better match with the current driving condition of the vehicle, and thus it is possible to further reduce safety hazards during driving.

Figure 4:
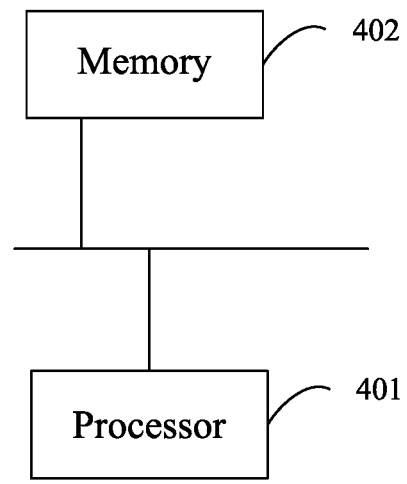
FIG. 4 is a schematic block diagram of a haptic feedback control device according to a fourth embodiment of the present disclosure.

In a fourth embodiment of the present disclosure, a haptic feedback control device may be provided. A block diagram showing the structure of the haptic feedback control device may be shown in FIG. 4. The haptic feedback control device may include at least one processor 401, and a non-transitory memory 402 communicated with the at least one processor 401. The non-transitory memory 402 may be configured for storing instructions executable by the at least one processor 401, and the instructions may be executed by the at least one processor 401 to enable the at least one processor 401 to execute the haptic feedback method for the touch display screen of the vehicle described in any embodiment above.

In some embodiments, the non-transitory memory 402 may be connected to the processor 401 by means of a bus. The bus may include any number of interconnected wires and bridges, and the bus may be configured for connecting one or more processors to various circuits of the non-transitory memory 402. As is well known in the art, the bus may also be configured for connecting various other circuits, such as peripherals, voltage regulators, power management circuits, or the like. Therefore, the bus will not be further described in details herein. A bus interface may provide an interface between the bus and a transceiver. The transceiver may include an element. However, the transceiver may also include a plurality of elements, such as a plurality of receivers and transmitters, and may be configured for providing units configured for communicating with various other devices on a transmission medium. The data processed by the processor may be transmitted over the wireless medium via an antenna. Further, the antenna may also receive data and further transmit the data to the processor 401.

The processor 401 may be responsible for managing the bus and the usual processing. The processor 401 may also provide various functions, including timing, peripheral interfaces, voltage regulation, power management, and other control functions. The non-transitory memory 402 may be configured for storing the data used by the processor when executing operations.

In a fifth embodiment of the present disclosure, a computer readable and non-transitory storage medium may also be provided. The medium may have a computer program stored therein. When the computer program is executed by a processor, the haptic feedback method for the touch display screen of the vehicle in any embodiment described above may be executed.

That is, those skilled in the art may understand that, all or part of the operations or actions of the methods described in the foregoing embodiments may be completed by a program instructing related hardware. The program may be stored in a storage medium, and include a plurality of instructions for making a device (such as a single chip microcomputer, a chip, or the like) or a processor to execute all or part of the operations or actions of the methods in various embodiments of the present disclosure. The foregoing storage medium may include various medium capable of storing program codes. The medium may include a USB flash disk, a mobile hard disk drive, a read-only memory (ROM), a random access memory (RAM), a magnetic disk, an optical disk, or the like.

Those skilled in the art may understand that the above embodiments are specific embodiments for implementing the present disclosure. However, various changes can be made in forms and details without departing from the spirit and scope of the present disclosure.

What is claimed is:

1. A haptic feedback method for a touch display screen display of a vehicle, comprising:
   acquiring a touch operation of a user from the touch display screen of the vehicle;
   determining a type of the acquired touch operation, and retrieving a pre-stored feedback signal corresponding to the type of the touch operation, wherein different types of the touch operations correspond to different feedback signals; and
   transmitting the corresponding feedback signal to an actuator, and driving the actuator to vibrate by using the feedback signal for providing haptic feedback; wherein
   before transmitting the corresponding feedback signal to the actuator, the method further comprises:
   acquiring current driving condition data of the vehicle, the current driving condition data of the vehicle comprising: data indicating a degree of bumping of the vehicle; and data indicating a volume condition of a player in the vehicle; and
   adjusting the corresponding feedback signal based on the current driving condition data of the vehicle to reduce influence to haptic sensitivity of the user and caused by vibration of the vehicle, wherein the vibration of the vehicle is caused by bumping of the vehicle and working of the player;
   wherein transmitting the corresponding feedback signal to the actuator comprises: transmitting the adjusted feedback signal to the actuator, and driving the actuator to vibrate by using the adjusted feedback signal for providing the haptic feedback; and
   adjusting the corresponding feedback signal based on the current driving condition data of the vehicle, comprising: adjusting the feedback signal to increase a strength of the feedback signal when the vehicle is in a bumpy state.

2. The haptic feedback method according to claim 1, wherein adjusting the corresponding feedback signal based on the current driving condition data of the vehicle comprises: adjusting a strength of the feedback signal by adjusting at least one of an amplitude, a frequency, and a duration time of the feedback signal based on the data indicating the degree of bumping of the vehicle.

3. The haptic feedback method according to claim 1, wherein transmitting the corresponding feedback signal to the actuator comprises:
   transmitting the corresponding feedback signal to the actuator connected to the touch display screen.

4. The haptic feedback method according to claim 1, wherein transmitting the corresponding feedback signal to the actuator comprises:
   simultaneously transmitting the corresponding feedback signal to a plurality of actuators of the vehicle.

5. The haptic feedback method according to claim 4, wherein simultaneously transmitting the corresponding feedback signal to a plurality of actuators of the vehicle comprises:
   simultaneously transmitted to a first actuator connected to the touch display screen of the vehicle, a second actuator connected to the vehicle seat, and a third actuator connected to the steering wheel.

6. A haptic feedback system, comprising:
   a touch display screen of a vehicle, configured for receiving a touch operation of a user;
   an actuator; and
   a processor, communicating with the touch display screen and the actuator, and configured for:
   receiving the touch operation of the user;
   determining a type of the acquired touch operation, and retrieving a pre-stored feedback signal corresponding to the type of the touch operation; wherein different types of the touch operations correspond to different feedback signals; and transmitting the corresponding feedback signal to the actuator;

wherein the actuator is configured for executing the feedback signal for providing haptic feedback;

Wherein the driving state detector is configured for acquiring current driving condition data of the vehicle, comprising: data indicating a degree of bumping of the vehicle; and data indicating a volume condition of a player in the vehicle; and further transmitting the current driving condition data of the vehicle to the processor, the processor is further configured for adjusting the corresponding feedback signal based on the current driving condition data of the vehicle to reduce influence to haptic sensitivity of the user and caused by vibration of the vehicle, wherein the vibration of the vehicle is caused by bumping of the vehicle and working of the player, and further transmitting the adjusted feedback signal to the actuator; and the actuator is configured for executing the adjusted feedback signal for providing the haptic feedback;

adjusting the corresponding feedback signal based on the current driving condition data of the vehicle, comprising: adjusting the feedback signal to increase a strength of the feedback signal when the vehicle is in a bumpy state.

7. The haptic feedback system according to claim 6, wherein the processor is further configured for adjusting a strength of the feedback signal by adjusting at least one of an amplitude, a frequency, and a duration time of the feedback signal based on the data indicating the degree of bumping of the vehicle.

8. The haptic feedback system of claim 6, wherein the processor is configured for simultaneously transmitting the corresponding feedback signal to a plurality of actuators of the vehicle.

9. The haptic feedback system of claim 6, wherein the processor is configured for transmitting the corresponding feedback signal to the actuator connected to the touch display screen.

10. The haptic feedback system of claim 6, wherein the processor is configured for simultaneously transmitting the corresponding feedback signal to a first actuator connected to the touch display screen, a second actuator connected to the vehicle seat, and a third actuator connected to the steering wheel.

11. The haptic feedback system according to claim 6, wherein the actuator is a linear actuator or a ceramic actuator.

12. A haptic feedback control device, comprising:
at least one processor; and
a non-transitory memory, communicated with the at least one processor, and configured for storing instructions executable by the at least one processor; wherein the instructions causes the processor to execute a haptic feedback method for a touch display screen display of a vehicle, and the haptic feedback method comprises:

acquiring a touch operation of a user from the touch display screen of the vehicle;

determining a type of the acquired touch operation, and retrieving a pre-stored feedback signal corresponding to the type of the touch operation, wherein different types of the touch operations correspond to different feedback signals; and transmitting the corresponding feedback signal to an actuator, and driving the actuator to vibrate by using the feedback signal for providing haptic feedback; wherein before transmitting the corresponding feedback signal to the actuator, the method further comprises:

acquiring current driving condition data of the vehicle, the current driving condition data of the vehicle comprising: data indicating a degree of bumping of the vehicle; and data indicating a volume condition of a player in the vehicle; and adjusting the corresponding feedback signal based on the current driving condition data of the vehicle to reduce influence to haptic sensitivity of the user and caused by vibration of the vehicle, wherein the vibration of the vehicle is caused by bumping of the vehicle and working of the player;

wherein transmitting the corresponding feedback signal to the actuator comprises: transmitting the adjusted feedback signal to the actuator, and driving the actuator to vibrate by using the adjusted feedback signal for providing the haptic feedback; and adjusting the corresponding feedback signal based on the current driving condition data of the vehicle, comprising: adjusting the feedback signal to increase a strength of the feedback signal when the vehicle is in a bumpy state.

13. The haptic feedback control device according to claim 12, wherein adjusting the corresponding feedback signal based on the current driving condition data of the vehicle comprises: adjusting a strength of the feedback signal by adjusting at least one of an amplitude, a frequency, and a duration time of the feedback signal based on the data indicating the degree of bumping of the vehicle.

14. The haptic feedback control device according to claim 12, wherein the corresponding feedback signal to the actuator comprises:

transmitting the corresponding feedback signal to the actuator connected to the touch display screen.

15. The haptic feedback control device according to claim 12, wherein transmitting the corresponding feedback signal to the actuator comprises:

simultaneously transmitted to a first actuator connected to the touch display screen of the vehicle, a second actuator connected to the vehicle seat, and a third actuator connected to the steering wheel.

* * * * *